$$\text{3,791,994}$$
METHOD OF PRODUCING ADSORPTION COKE FROM HIGH WATER CONTENT BROWN COAL

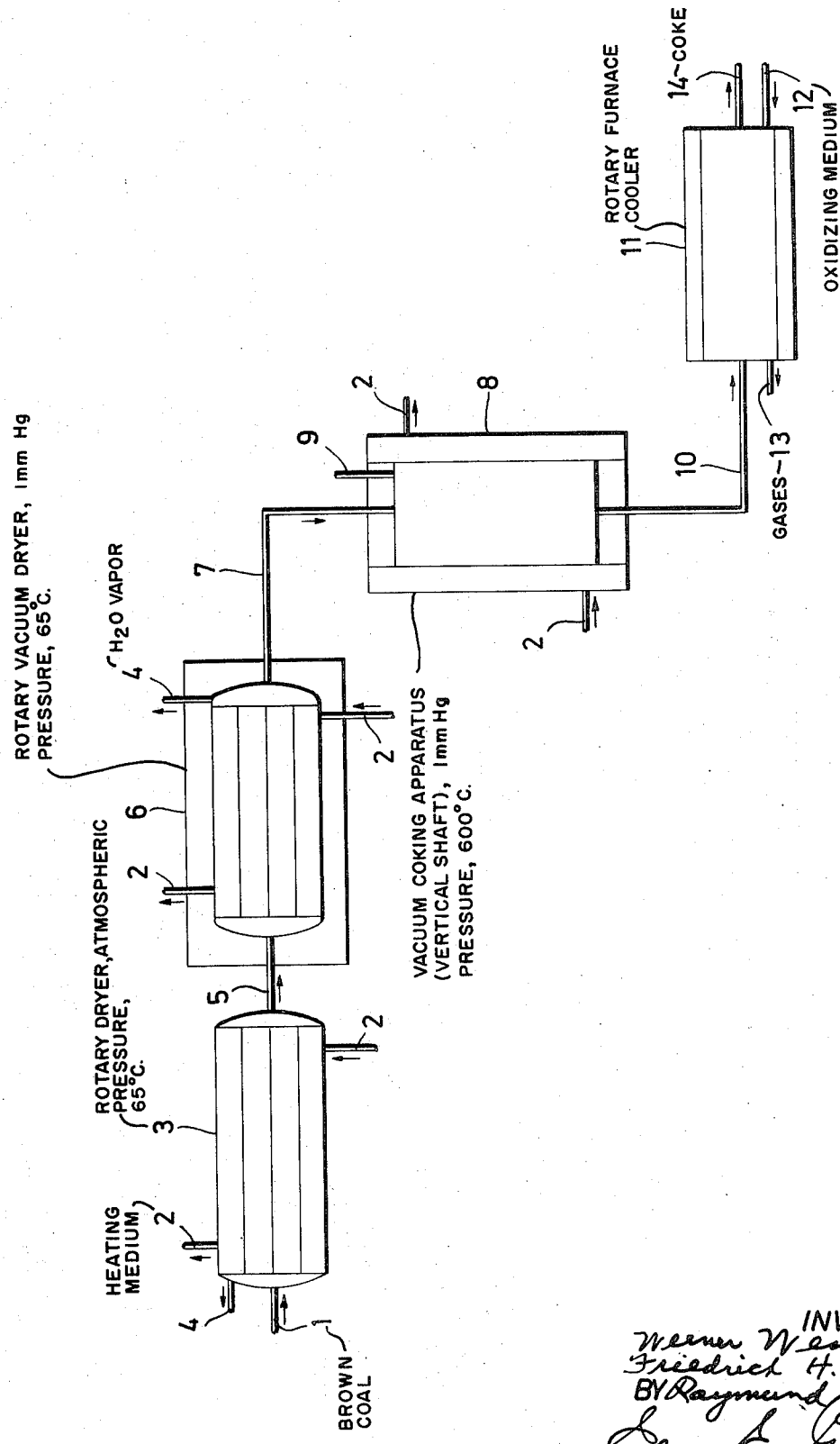

Werner Wenzel, Friedrich Hermann Franke, and Raymund Jäger, Aachen, Germany, assignors to Rheinische Braunkohlenwerke AG., Cologne, and Werner Wenzel, Aachen, Germany
Filed May 19, 1971, Ser. No. 144,803
Claims priority, application Germany, May 19, 1970,
P 20 24 210.8
Int. Cl. C10b 47/20
U.S. Cl. 252—421                                     8 Claims

ABSTRACT OF THE DISCLOSURE

In a method of producing adsorbent materials, such as adsorption cokes from a raw material of high water content, such as raw brown coal, at least one part of the vaporizable components of said raw material are removed by exposing said raw material to a vacuum.

BACKGROUND OF THE INVENTION

This invention relates to a method of and an apparatus for producing materials, particularly cokes, for adsorption purposes. Such materials are used for obtaining or separating gaseous or liquid components from gases or liquids which, for this purpose, are contacted with the adsorbent material at appropriate temperatures. The surface of the adsorbent material, dependent upon its grade, separates and binds a greater or lesser quantity of adsorbates.

The grade of an adsorbent material depends upon the magnitude of the surfaces and micropores accessible for the adsorption, the maximum enrichment per weight, the speed of adsorption and the attrition strength of the material. The last-named property is essential concerning the handling thereof in treating apparatuses. In case the adsorbent material is used in exhaust fume purifying processes, its degree of ignitability is also a significant property to be considered.

It is well known that besides the properties of the initial raw material, the aforenoted characteristics of adsorption coke are affected in a large measure by the methods used during its preparation. For a great number of years methods of producing adsorption cokes have been practiced which differ from one another particularly in the selection of the coking temperature, the speed of heat increase during coking, and the duration of coking. It was found that economical carbon-carrying raw materials, such as brown coal, turf, or wood, do not yield, with conventional methods, high grade adsorption cokes which simultaneously satisfy the requirements of large specific surface, high adsorbing speed, great strength and high igniting temperature.

OBJECT AND SUMMARY OF THE INVENTION

It is an object of the invention to provide an improved method of and apparatus for economically producing adsorbent materials, particularly adsorption cokes of substantially improved grade.

Briefly stated, according to the invention, at least one part of the vaporizable components of the carbon-carrying raw material having a high bound water content such as brown coal, turf, or wood, are removed by exposing it to a vaccum which may have a value of between less than normal pressure and less than 1 mm. Hg pressure.

The invention will be better understood as well as further objects and advantages will become more apparent from the ensuing detailed specification of the method and apparatus according to the invention, taken in conjunction with the sole figure showing a schematic illustration of the apparatus.

GENERAL CONSIDERATIONS AND MODIFICATIONS RELATING TO THE METHOD

In addition to exposing the raw material to vacuum which is the principal characteristic of the invention, it is further proposed to submit the material to a heat treatment for drying and/or coking. The treatment of the coal may be performed in two stages: in the first stage the water content is vaporized (drying) and in the second stage the gaseous components obtained by thermal decomposition (coking) are withdrawn from the material. It has been found to be particularly advantageous to perform the aforenoted heat treatment at least partially (for example, at least during one of the two abovementioned stages) in a vacuum. Here too, the technically practical range of vacuum extends down to under 1 mm. Hg pressure.

It is significant that the use of vacuum even in one of the two aforenoted stages of the production of adsorption coke leads to a substantial improvement in the properties of the coke. Thus, according to the invention, the adsorbent is produced either with vacuum drying followed by coking under normal pressure or with drying under normal pressure followed by vacuum coking or with vacuum drying followed by vacuum coking. In case both stages are performed in a vacuum, the magnitude of the vacua in the two stages may be different.

According to a further development of the method according to the invention, the drying of the coal or the like under vacuum is preceded by a drying under normal pressure, for example, in such a manner that during the drying process under normal pressure the water content of the raw material is decreased to approximately 15%, and then the water content is decreased to approximately 0% under vacuum. According to a further possibility, the raw brown coal having a grain size up to approximately 10 mm., is predried during a period of approximately 75–160 minutes to reduce its water content to approximately 15–5% and thereafter the drying process is continued in a vacuum. If raw brown coal having a grain size of under 6–7 mm. is used, the process may be performed in such a manner that, starting from a water content of 52%, the latter is reduced to approximately 15% in the predried coal within approximately 75 minutes. It may be said in general that the permissible and expedient speeds of heat increase depend upon the type and properties, particularly the grain size, of the initial raw material.

Similar considerations apply to the performance of the coking process. Thus, for obtaining a very satisfactory strength of the adsorption coke, it has been found to be particularly advantageous to perform the coking of the dried coal with the mean speed of heat increase of approximately 10° C./min., while a vacuum of approximately 1 mm. Hg pressure has been maintained. The end temperature of the coking process may reach approximately 1000° C. The coking too, may be performed at different pressure levels. Thus, for example, first a heating is performed in a vacuum and in the second phase of the coking, further heating occurs under normal pressure conditions. In the first phase, the prevailing temperature may reach 500° C., whereas in the second phase the temperature may be 500–800° C.

Although the adsorption cokes obtained with a process utilizing the aforeoutlined teaching of the invention have, as compared to cokes made with known processes, a substantially different structure with improved adsorption properties, additional measures may be taken which are already known to lead to improved properties of adsorption cokes prepared in a known manner. Thus, according to the invention, it is further proposed that the coke produced under vacuum is partially gasified with oxidizing gases, such as oxygen or mixtures of oxygen and other gases, such as nitrogen and/or water vapor and/or carbon dioxide.

It is to be understood that although coal or brown coal is mentioned, most frequently in this specification, other carbon-carrier raw materials which meet the conditions set forth in the introduction, are also to be included.

The invention will be further illustrated by the examples which follow.

Example 1

Raw brown coal composed of:

| | Percent |
|---|---|
| Fixed carbon | 21.8 |
| Volatile components | 24.5 |
| Water content | 52 |
| Ash content | 1.7 | with a grain size of below 10 mm. was exposed on a sieve base to an air stream of a speed of 0.024 m./s. and a temperature of 65° C. The convective drying was effected under normal pressure by the air of 12.6% humidity until the water content of the coal was down to 5% (period of drying: 160 minutes).

The coal dried by the aforedescribed method was subsequently heated in a muffle furnace with a speed of heat increase of 10° C. per minute to a coking end temperature of 600° C. and was maintained at this temperature for 180 minutes.

The coke was cooled in the same muffle furnace with the exclusion of air for a period of 60 minutes.

The characterizing properties of the adsorption coke prepared according to the method described in this example were found to be as follows:

Specific surface: 190.09 m.²/g.

Mean adsorption speed for $N_2$ at $-195°$ C. in the range of $$0 \leq \frac{PS}{PS} \leq 0.1: \qquad V_{ads} = 0.98 \frac{cm.^3 N_2}{g.\ coke.min.}$$

Ignition temperature (with respect to 60 l. oxygen/h.): 101° C.

Sieve passage subsequent to static pressure load (sieve passage: $d_k \leq 2$ mm): 37.47%

The specific surface was measured by the BET-process; the ignitability was tested in a gas flow apparatus and was determined as the ignition point in oxygen, and the compression strength was measured by loading with a pressure of 40 kp./cm.² a compression bed 13 mm. high consisting of a material having a grain size 4 and 5 mm.

Example 2

Raw brown coal which was predried in a manner similar to Example 1, but coked at 1000° C., yielded a coke with the following properties:

Specific surface ........................m.²/g.. 173.48

Adsorption speed ....................1.26 $\frac{cm.^3 N_2}{g.\ coke.min}$

Ignition temperature ....................° C.. 289
Sieve passage after static pressure ($d_k \leq 1$ mm.) ........................percent.. 32.11

Example 3

The same type of raw brown coal as used in Examples 1 and 2 was predried for a period of 160 minutes down to a water content of 5% in the same drying apparatus as used in Examples 1 and 2.

To complete the drying operation, the predried coal was subsequently dried in a vacuum of 1 mm. Hg pressure during a period of 15 minutes. The final water content of the coal was 0.5%.

The dry coal was then heated in a muffle furnace as used in Examples 1 and 2 with a speed of heat increase of 10° C. per minute at a vacuum of 1 mm. Hg pressure. The end temperature of the heat treatment was 1000° C. The coke was maintained at the given end temperature and vacuum for 180 minutes.

The properties of the coke produced according to the aforeoutlined method according to the invention, were found to be as follows:

Specific surface ........................m.²/g.. 326.24

Adsorption speed ....................3.54 $\frac{cm.^3 N_2}{g.\ coke.min}$

Ignition temperature ....................° C.. 377
Sieve passage after static pressure load ..percent.. 36.55

APPARATUS FOR PRACTICING THE METHOD ACCORDING TO THE INVENTION

Turning now to the figure, the raw brown coal 1 is introduced into the rotary dryer 3 which is heated by heating media 2, preferably vapor. Subsequent to the explusion of water vapor 4 from the material, the latter, as predried raw brown coal 5 is post-dried in the rotary vacuum dryer 6, heated by heating media 2. The water vapor from the coal is withdrawn at 4. The post-dried raw brown coal 7 is introduced into a vertical shaft vacuum coking apparatus 8 externally heated by heating media 2. From the coking apparatus 8 the exhaust fumes are withdrawn at 9 and the vacuum coke 10 is introduced into the rotary furnace cooler 11 where it is partially gasified by the oxidizing medium 12. The gases and oxidized vacuum coke are withdrawn from the rotary furnace cooler 11 at 13 and 14, respectively. The vacuum coke 10 may be cooled in the rotary cooler 11 by means of an inert gas contacting said coke in a counterflow.

The sealing and conveying components between the individual stations of the apparatus are of known structure and are therefore not illustrated in the drawing and are not described in greater detail.

What is claimed is:

1. A method of producing adsorbent coke from a carbon-carrying raw material having a high bound-water content, which comprises removing water vapor from the carbon-carrying raw material at a temperature of at least about 65° C. and coking by expelling thermally-decomposable substances from said carbon-carrying raw material at a temperature above 600° C., wherein water vapor is removed from said carbon-carrying raw material in a first drying operation under atmospheric pressure and a second drying operation under vacuum at a pressure about 1 mm. Hg and wherein coking is performed in a first phase of heat treatment under vacuum at a pressure of about 1 mm. Hg and a second phase under atmospheric pressure.

2. The method of claim 1, wherein during the first drying operation the water content of said carbon-carrying raw material is reduced to about 15% and during the second drying operation the water content is reduced to about 0%.

3. The method of claim 1, wherein said carbon-carrying raw material is raw brown coal having a grain size of up to 10 mm.; the first drying operation has a duration of approximately 75–160 minutes during which the water content of said raw brown coal is reduced to approximately 15–5% and said water content is further reduced during the second drying operation.

4. The method of claim 1, wherein said carbon-carrying raw material is raw brown coal having a grain size of less than about 6–7 mm. and an initial water content of 52%; and the first drying operation has a duration of approximately 75 minutes during which the water content of said raw brown coal is reduced to approximately 15%.

5. The method of claim 1, wherein coking is performed with a mean speed of temperature increase of 10° C. per minute.

6. The method of claim 1, wherein the end temperature of coking is approximately 1000° C.

7. The method of claim 1, wherein the temperature in the first phase of coking has a value of up to 500° C. and the temperature during the second phase of coking is between 500 and 800° C.

8. The method of claim 1, wherein the adsorbent coke product is partially oxidized with oxidizing gases.

References Cited

UNITED STATES PATENTS

| | | | |
|---|---|---|---|
| 1,068,314 | 7/1913 | Burstall et al. | 201—35 |
| 1,450,888 | 4/1923 | Illingworth | 201—35 |
| 1,703,419 | 2/1929 | Dwyer | 201—35 |
| 2,276,362 | 3/1942 | Wolf | 201—35 |
| 3,623,999 | 11/1971 | Juntgen et al. | 201—44 |
| 1,933,579 | 11/1933 | Barker | 252—421 |
| 2,648,637 | 8/1953 | Rodman | 252—421 |

NORMAN YUDKOFF, Primary Examiner

D. EDWARDS, Assistant Examiner

U.S. Cl. X.R.

201—34, 35, 37, 44